(12) United States Patent
Midtun et al.

(10) Patent No.: US 10,157,228 B2
(45) Date of Patent: Dec. 18, 2018

(54) COMMUNICATION SYSTEM INCLUDING A CONFIDENCE LEVEL FOR A CONTACT TYPE AND METHOD OF USING SAME

(71) Applicants: James Dean Midtun, Chandler, AZ (US); Tom Quan, Nepean Ontario (CA)

(72) Inventors: James Dean Midtun, Chandler, AZ (US); Tom Quan, Nepean Ontario (CA)

(73) Assignee: Mitel Networks Corporation, Ottawa, Ontario (CA)

(*) Notice: Subject to any disclaimer, the term of this patent is extended or adjusted under 35 U.S.C. 154(b) by 529 days.

(21) Appl. No.: 13/933,340

(22) Filed: Jul. 2, 2013

(65) Prior Publication Data

US 2015/0012554 A1 Jan. 8, 2015
US 2016/0364482 A9 Dec. 15, 2016

Related U.S. Application Data

(60) Provisional application No. 61/850,763, filed on Feb. 22, 2013.

(51) Int. Cl.
| | |
|---|---|
| *G06F 17/30* | (2006.01) |
| *G06Q 10/10* | (2012.01) |
| *H04M 1/2745* | (2006.01) |
| *H04L 29/12* | (2006.01) |

(52) U.S. Cl.
CPC ........ *G06F 17/30861* (2013.01); *G06Q 10/10* (2013.01); *H04M 1/274508* (2013.01); *H04L 61/1594* (2013.01); *H04M 1/274583* (2013.01)

(58) Field of Classification Search
CPC .................. G06F 17/3053; G06F 17/30817
USPC ........................................................ 707/758
See application file for complete search history.

(56) References Cited

U.S. PATENT DOCUMENTS

| | | | | |
|---|---|---|---|---|
| 8,909,950 | B1* | 12/2014 | Levchuk | H04W 52/223 713/300 |
| 8,931,055 | B2* | 1/2015 | Shea | G06F 21/604 707/802 |
| 9,069,436 | B1* | 6/2015 | Fieweger | G06F 3/0481 |
| 2003/0140043 | A1* | 7/2003 | Hotchkiss | G06F 19/322 |
| 2004/0230637 | A1* | 11/2004 | Lecoueche | G10L 15/20 709/200 |
| 2005/0203747 | A1* | 9/2005 | Lecoeuche | G06F 17/30731 704/270.1 |
| 2006/0206448 | A1* | 9/2006 | Hyder | G06Q 10/10 |
| 2006/0248054 | A1* | 11/2006 | Kirshenbaum | G06F 17/30705 |
| 2006/0294051 | A1* | 12/2006 | Kapadia | G06F 17/30873 |

(Continued)

OTHER PUBLICATIONS

ClearContext Version 7.0 User Guide; http:llwww.Clearcontext.comluser_guidelautoassign.html, pp. 1-60.*

(Continued)

*Primary Examiner* — Tarek Chibouki
*Assistant Examiner* — Eddy Cheung

(57) ABSTRACT

A communication system and method are disclosed. The system and method use a contact type and a confidence level to determine whether to proceed with an operation, which operation to perform and/or how to perform an operation. The method and system may be used to determine a confidence level for a contact type, and may be used to update existing contact information, as well as for other uses.

20 Claims, 4 Drawing Sheets

(56) References Cited

U.S. PATENT DOCUMENTS

| | | | |
|---|---|---|---|
| 2007/0088715 A1* | 4/2007 | Slackman | G06Q 10/10 |
| 2007/0130130 A1* | 6/2007 | Chan | G06F 17/30477 |
| 2008/0097982 A1* | 4/2008 | Gupta | G06F 17/30864 |
| 2008/0270174 A1* | 10/2008 | Schlesinger | G06F 21/6218 705/1.1 |
| 2009/0137276 A1* | 5/2009 | Baldischweiler | G06F 3/0617 455/558 |
| 2009/0210416 A1* | 8/2009 | Bennett | G06F 17/30241 |
| 2009/0217182 A1* | 8/2009 | Grechanik | G06F 8/38 715/762 |
| 2009/0228264 A1* | 9/2009 | Williams | G10L 13/027 704/9 |
| 2010/0082640 A1* | 4/2010 | Wexler | G06F 17/30867 707/748 |
| 2010/0161602 A1* | 6/2010 | Caceres | G06F 17/30539 707/736 |
| 2011/0125770 A1* | 5/2011 | Battestini | G06Q 10/00 707/758 |
| 2011/0153564 A1* | 6/2011 | Cochinwala | G06F 17/30581 707/624 |
| 2011/0191304 A1* | 8/2011 | Ristow | G06F 17/30 707/690 |
| 2011/0239293 A1* | 9/2011 | Perumal | G06F 21/552 726/21 |
| 2012/0166976 A1* | 6/2012 | Rauh | G06F 8/38 715/762 |
| 2012/0233668 A1* | 9/2012 | Leafe | G06F 9/44526 726/4 |
| 2013/0013738 A1* | 1/2013 | Astete | G06F 9/45533 709/217 |
| 2013/0031067 A1* | 1/2013 | Iyer | G06F 11/302 707/703 |
| 2013/0067039 A1* | 3/2013 | Hartzler | H04L 61/1594 709/219 |
| 2013/0218911 A1* | 8/2013 | Li | G06F 21/604 707/754 |
| 2013/0316809 A1* | 11/2013 | Katz | G07F 17/3241 463/29 |
| 2016/0188891 A1* | 6/2016 | Schlesinger | G06F 21/6218 726/1 |
| 2016/0364576 A1* | 12/2016 | MacLeod | G06F 21/6218 |

OTHER PUBLICATIONS

ClearContext Version 7.0 User Guide; http:11www.Clearcontext.comluser_guidelautoassign.html, pp. 1-60.*

ClearContext Version 6.0 User Guide; http://www.Clearcontext.com/user_guide/autoassign.html, pp. 1-60.

\* cited by examiner

COMMUNICATION SYSTEM INCLUDING A CONFIDENCE LEVEL FOR A CONTACT TYPE AND METHOD OF USING SAME

CROSS REFERENCE TO RELATED APPLICATION

This application includes subject matter that is related to and claims priority from U.S. Provisional Patent Application Ser. No. 61/850,763 filed on Feb. 22, 2013.

FIELD OF THE INVENTION

The present disclosure generally relates to communication systems and devices including contact lists and to methods of using the systems and devices. More particularly, the disclosure relates to communication systems including a confidence level associated with a contact type in a contact list and to methods of using such systems.

BACKGROUND OF THE DISCLOSURE

Electronic communication devices, such as computers, mobile phones, tablets, and the like often include or have access to a contact list database (contact list), which includes contact information relating to various contacts of a user of a communication device. In addition, the communication devices are capable of accessing and using multiple phone numbers, email addresses, or the like, allowing a user of the mobile device to effectively access multiple personas (e.g., work or personal or different work or personal personas) using a single communication device. Multiple work personas may be used, for example, for users that have multiple jobs or for someone who sells or distributes multiple product lines from different vendors. In theses cases, a user may maintain persona separation through different email addresses and/or phone numbers.

As adoption of mobile communication devices generally and "Bring Your Own Device" (BYOD) into the work environment specifically increases, mobile device users are increasingly combining business use and personal use of their communications devices. Accordingly, contact information for such users may include multiple email addresses, street addresses, phone numbers, titles, and the like for a given user or contact.

Some business applications exist that run on electronic communication devices, such as personal computers, mobile tablets, or mobile smartphones that allow a user to perform functions using the contact lists available to these applications. These contact lists are often made up of information from several different sources containing both the user's personal and business contacts. The applications available on the devices may perform different functions or perform functions differently based on a contact type; i.e., whether a contact is a "personal" contact, a "business" contact, or a particular type of personal or business contact.

Methods for categorizing contact information include manual categorization as well as automated categorization based on communication methods between a user and a contact. Once the contact information is categorized and stored, a user can manually edit the contact information using the communication device. The assigned category or contact type associated with the contact information can then be used for grouping, displaying or sorting the contact information on the user's device.

Although such techniques work for a variety of applications, the techniques generally require manual input and/or manipulation of contact information. Accordingly, improved methods and systems for assigning contact information are desired. In addition, improved systems and methods that perform an operation or perform an operation differently based on additional information associated with a contact are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS OF THE DISCLOSURE

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The disclosure describes exemplary electronic communication systems and methods. As set forth in more detail below, exemplary systems and methods use a contact list that includes a contact type and a confidence level associated with the contact type for a contact, wherein the confidence level is used to determine whether to perform an operation, which operation to perform, or how to perform an operation. Additionally or alternatively, the confidence level associated with a contact type can be used to update (e.g., dynamically and/or automatically) the contact information and for other functions, such as those set forth herein. The systems and methods described herein are advantageous over systems and methods that merely categorize contact types, because exemplary systems and methods of the present disclosure provide a confidence level associated with a contact type, such that, among other things, the contact information can be more accurate and desired operations can be performed with more confidence.

Figure 1:
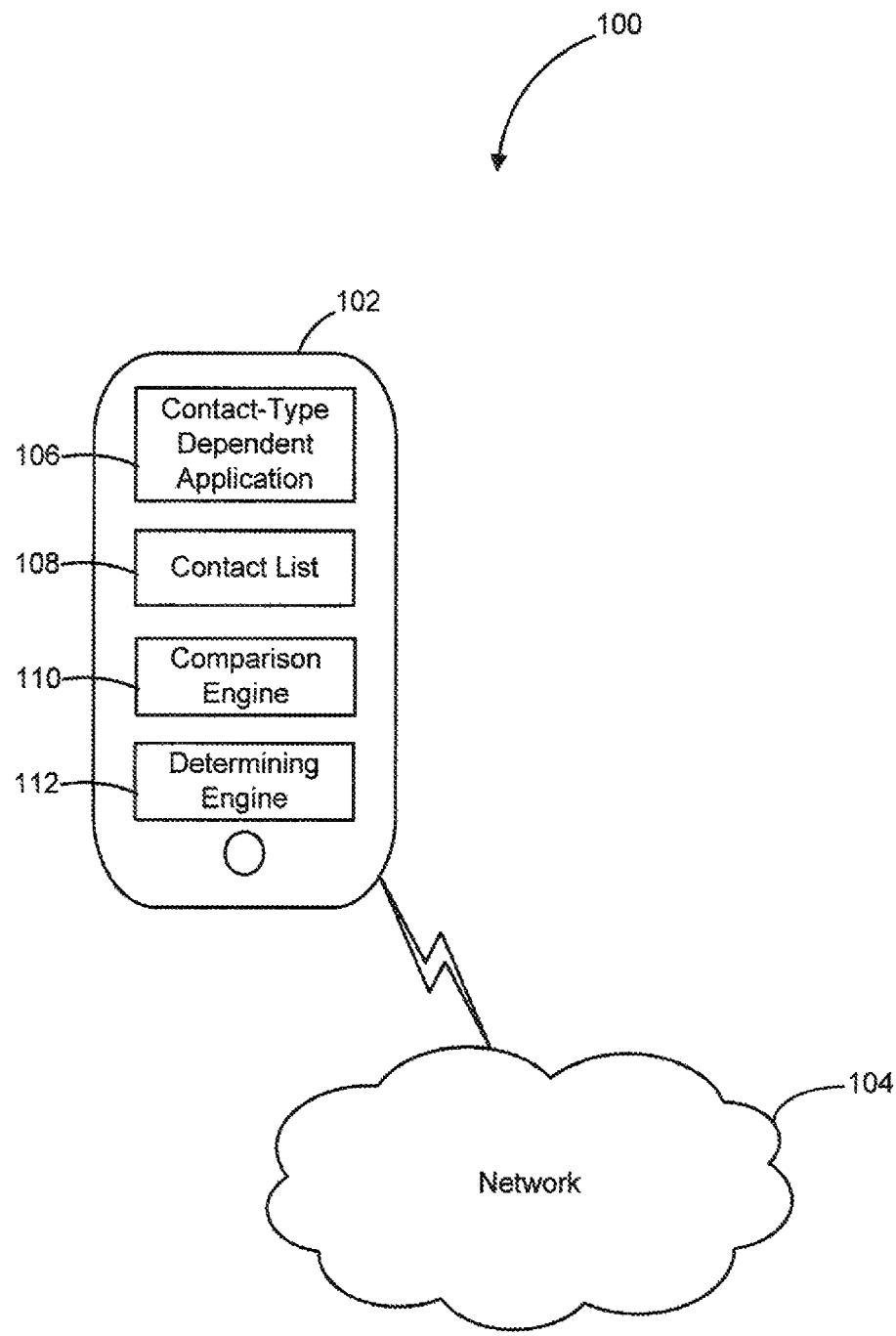
FIG. 1 illustrates a system in accordance with various exemplary embodiments of the disclosure.

FIG. 1 illustrates an exemplary system 100 in accordance with various embodiments of the disclosure. System 100 includes a device 102, optionally a communication network 104, a contact-type dependent application 106, a contact list 108, and a comparison engine 110. System 100 may also include determining engine 112.

Device 102 may include any suitable electronic device, such as a smart phone, a tablet computer, a personal computer, a work station, a server, a conference unit, or any other device that includes a user interface to allow a user to perform one or more tasks as described herein.

Device 102 may be a stand-alone device or may be coupled to a network (e.g., network 104) using wired or wireless technologies. By way of examples, device 102 includes a mobile device and network 104 includes a mobile communications network.

Although illustrated as part of device 102, one or more of contact-type dependent application 106, contact list 108, comparison engine 110, and determining engine 112 may not form part of device 102, but rather form part of network 104 or another device. For example, one or more of contact-type dependent application 106, contact list 108, comparison engine 110, and determining engine 112 may form part of network 104 or another device coupled to network 104.

Exemplary networks suitable for network 104 include a local area network (LAN), a wide area network, a personal area network, a campus area network, a metropolitan area network, a global area network, or the like. Network 104 may be coupled to one or more other devices using, for example, an Ethernet connection, other wired connections, a WiFi interface, mobile telecommunication technology, other wireless interfaces, or the like. Similarly, the network may be coupled to other networks using similar techniques.

Although not illustrated, device 102 may include a client or a web plugin to facilitate a user input of information for contact-type dependent application 106 using device 102. In exemplary cases, the client or web plugin allows a user to enter information regarding contact types and other information. Alternatively, the entire application may reside on device 102.

As used herein, the term "application" refers to coded instructions executable by a processor that can be used to perform singular or multiple related tasks. For example, an application may include standalone software, enterprise software, or any other suitable software. The application may be an independently operable application or form part of another application.

In general, contact-type dependent applications use information regarding a contact to perform, determine how to perform, or decide not to perform an operation. For example, a contact-type dependent application may perform an operation one way for a certain type of contact (e.g., a business contact) and require a confidence level to be greater to or equal to a threshold confidence value and perform the operation another way for a different type of contact (e.g., personal, friend, or family) having a confidence level greater than or equal to the same or another threshold confidence value. As set forth in more detail below, the application can be used for a variety of additional or alternative purposes, including automatically updating contact information, including contact type and confidence level, assessing and assigning confidence levels based on a categorization method and using the assessed confidence levels to apply decision thresholds for contact-type dependent communication operations, adding or correcting contact information based on a learned contact type, and performing operations (or not or performing an operation in a particular way) based on both a contact-type and a confidence level.

Exemplary contact-dependent applications include stand-alone applications, phone applications, email applications, social media applications, Unified Communication applications, and the like.

Contact list 108 includes a database of a user's contact and confidence levels for the contact. Each contact within contact list 108 may include one or more contact types (e.g., business, personal, friend, family, group, or the like) and a confidence level associated with one or more of the contact types. For example, a contact may have business contact information and a confidence level associated with the business-type contact of X % and personal contact information with a confidence level of Y %. In addition, a confidence level may be associated with a specific application or operation. For example, a contact's personal email address may have an A % confidence level and the contact's personal phone number may have a B % confidence level. As discussed in more detail below, the contact types and confidence levels for a contact may be automatically and dynamically updated—e.g., using application 106 or another application. If a confidence level for a contact is unknown, the value may be set to low—e.g. 0 or 0%. And, if contact type information is input by a user or sent from a contact, the confidence level may be set to high—e.g., 1 or 100%.

A contact type and an associated confidence level may be manually input or automatically generated based on various factors or criteria, discussed in more detail below, and stored within contact list 108. For example, communication methods between a user and a contact may be used to determine a type of contact and the associated confidence level (which may be for a specific operation). Whether by manual or automated means, a confidence level for a contact type may be based on the technique used to determine the contact type, and this information may be automatically or manually updated.

Comparison engine 110 uses a processor to compare a confidence level associated with a contact to a threshold confidence value for an operation. The confidence level for a contact type may be operation-dependent. That is, a different threshold confidence level may be assigned to a contact type for each operation type. For example, an operation may have an 80% threshold confidence value for sending an email to a business contact. In this case, comparison engine 110 compares a known or calculated confidence level to the threshold confidence value to determine whether or how to proceed with the operation (email).

Determining engine 112 can be used to determine a confidence level—e.g., when none exists for a contact or to update an existing confidence level for a contact. Determining engine 112 or another engine can also be used to determine a type of contact. Factors that may be used to determine a confidence level include: whether the contact information was input manually or determined—e.g., by engine 112, how long it has been since the contact information was used or verified, as well as contact information (e.g., phone numbers, email address, and the like). An exemplary process for automatically setting a confidence level is discussed in more detail below in connection with FIG. 4.

Figure 2:
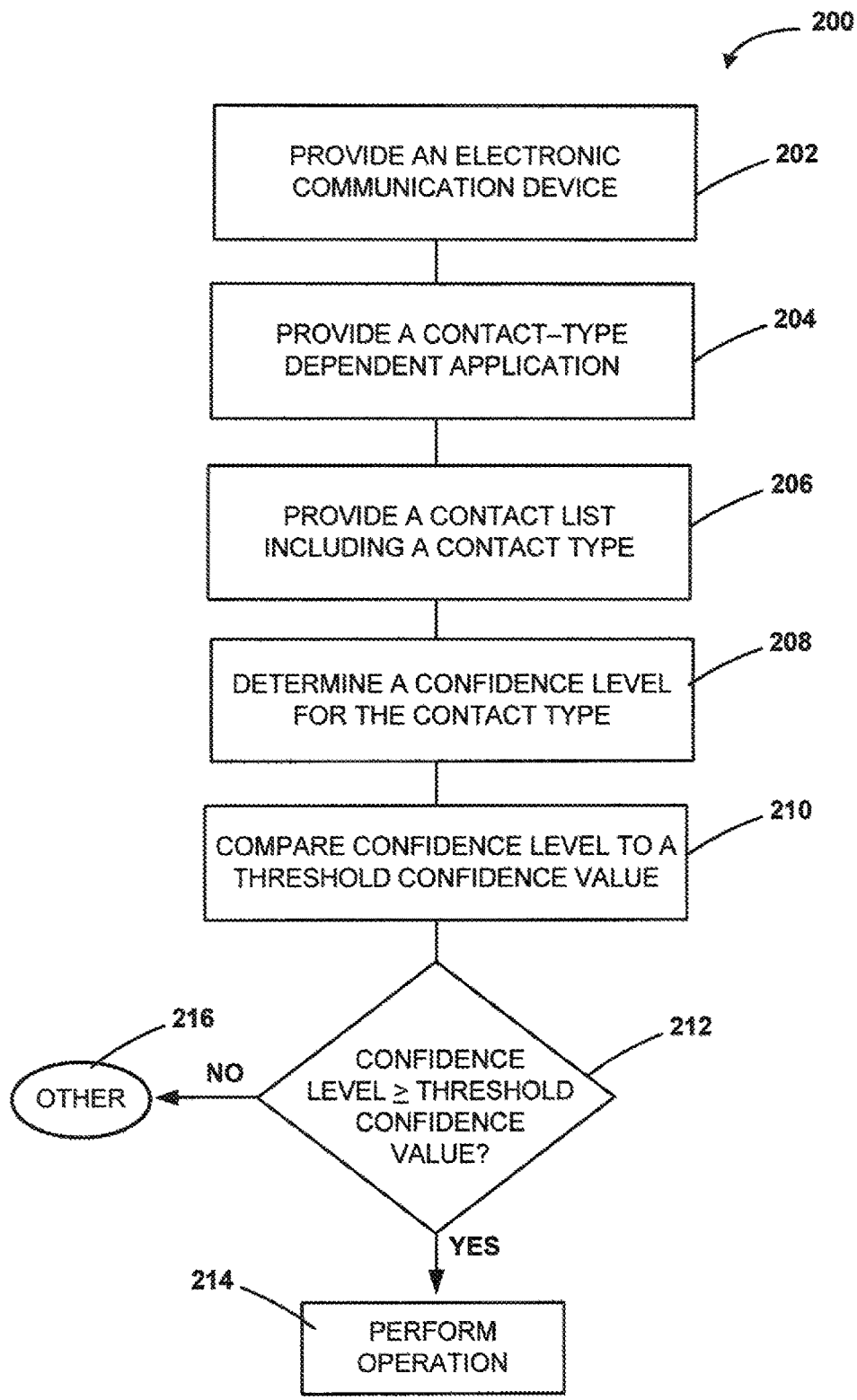
FIG. 2 illustrates a method in accordance with additional exemplary embodiments of the disclosure.

Turning now to FIG. 2, a communication method 200, in accordance with exemplary embodiments of the disclosure, is illustrated. Method 200 includes the steps of providing an electronic communication device (step 202), providing a contact-type dependent application for performing an operation using the electronic communication device (step 204), providing a contact list comprising contact information, wherein the contact information includes a contact type corresponding to a contact (step 206), determining a confidence level for the contact type (step 208), comparing the confidence level to a threshold confidence value (step 210), determining whether the confidence level is greater than or equal to a threshold confidence level (step 212) and if the confidence level is greater than or equal to the threshold confidence value, then performing the operation using the contact type (step 214). If, on the other hand, the confidence level is less than the threshold confidence value, then the operation may not be performed, a different operation may be performed, the user may be prompted to authorize an operation, or the like. These alternatives are generally indicated as "other" (216) in FIG. 2.

During step 202 an electronic device, such as device 102 is provided.

A user may call an application or an application may be automatically launched during step 204. As noted above, exemplary contact-type dependent applications include stand-alone applications, phone applications, email applications, social media applications, Unified Communication applications, and the like. The application may be native to a user's device (e.g., device 102) or be located remote from the device.

During step 206 a contact list is provided. A user need not view the contact list, but the list is generally available for use by the contact-type dependent application. As noted above, the contact list may reside on a user's device, elsewhere on a network, or on another device.

During step 208, a confidence level for a contact type (which may be for one or more operations performed by the application provided during step 204) is determined. Once or as determined, a confidence level may be stored, so step 208 is not necessarily required for each communication between a user and a contact. However, in accordance with some embodiments of the invention, a confidence level may be verified, checked, and/or updated, after the confidence level is stored. A confidence level for a contact type may be determined using various factors, including a mode of contact type entry—e.g., if manual, then the confidence is high (e.g., 100% on a scale), if imported from another source, then the confidence level may be a little lower—e.g., 80-90%, if received from the contact, then the level would be high (e.g., 95%), if derived from another source (e.g., as described herein), then the confidence level may be lower, and the level may be determined based on how the confidence level was derived. As noted, a contact type and confidence level may be determined at the same time. The contact type and/or confidence level can be automatically adjusted dynamically.

A confidence level may be associated with one or more contact types for each contact. In addition, the confidence level may be associated with a particular operation, such as an operation performed by the application provided during step 204.

As noted above, a confidence level may change over time. For example, if a user has not used a contact's information for a period (e.g., greater than six months or greater than a year), then the confidence level for that contact may decrease. Similarly, the confidence level and/or contact type may change based on communications between the user and the contact.

If determined automatically, the contact type and/or confidence level may be based on, for example, the contact information (e.g., business or personal phone or email provided by a contact or otherwise imported into the contact list). Additionally or alternatively, the contact type and/or confidence level may be based on communication attributes between the user and a contact. Other factors may include real-time analytics, such as frequency of communication, type of communication, length of communication, content of the communication, and the like.

During step 210 a confidence level corresponding to a contact type of a contact is compared to a threshold confidence value. The comparison may be performed using, for example, comparison engine 110. The comparison may be application and/or operation specific for a contact type.

Next, at step 212, a determination is made. In this illustrated case, if the confidence level (e.g. for all applications of for one or more particular applications) is greater than or equal to the threshold confidence value, the method 200 proceeds to step 214. Otherwise, method 200 proceeds to step 216 or may terminate or may return to another application. Alternatively, an operation may function differently if the confidence level is greater than a threshold value, compared to a situation in which the confidence level is not greater than or equal to the threshold confidence value.

Contacts that contain multiple contact types may cause a conflict for contact-type dependent operations. Exemplary embodiments of this disclosure provide for the creation of rules that consider operations involving these contact types for such operations. For instance, a rule may state that if a user is calling a business contact to use a PBX driven softphone on the device and if the user is calling a personal contact to use the native dialer of the mobile device. If a user places a call to a contact that has some level of confidence as being both a "business" and a "personal" contact, the application may prompt the user or use additional criteria (time of day, other participants, etc.) to determine the proper operation or request authorization to perform the operation.

Figure 3:
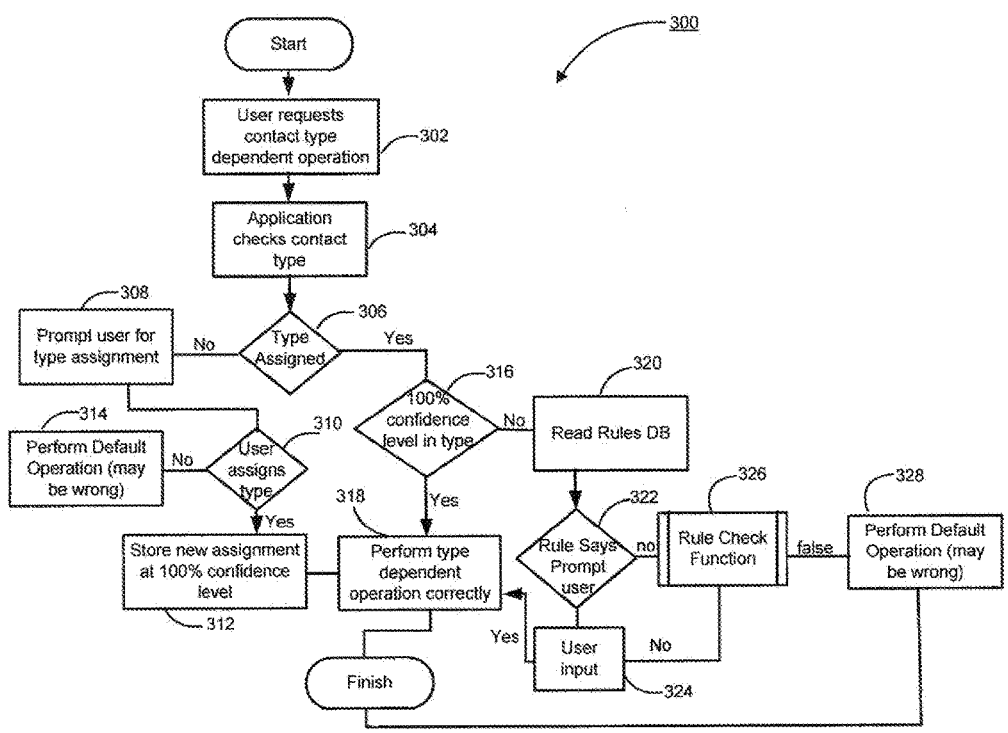
FIG. 3 illustrates yet another method in accordance with exemplary embodiments of the disclosure.

FIG. 3 illustrates another method 300 in accordance with additional embodiments of the disclosure. Method 300 includes the steps of a user requesting or launching a contact-type dependent operation (e.g., a phone, email, Unified Communication, or similar operation) (step 302), a check contact type step (step 304), and a determination of whether a contact type was assigned (step 306). Step 302 may be the same or similar to step 204.

If a contact type is not assigned, a user is prompted for a contact-type assignment (step 308). At this point, a used may enter the contact type using a device having a suitable user interface. Then, a determination is made whether the user has selected or otherwise input a contact type (step 310). If the user input the contact type, then the contact type is stored and the confidence level assigned may be high—e.g., 100% (step 312). If on the other hand, a user does not input the contact type, then a default operation or no operation may be performed (step 314).

If, during step 306, a determination is made that the contact type is assigned, a determination is made as to whether the confidence level for the contact type (e.g., for the specific operation) is high or 100% (step 316). If the confidence level is high, then the operation is performed (step 318).

If, on the other hand, the confidence level is less than high, for example, 100%, then a confidence value may be determined. In the illustrated case, a read rules database is employed (step 320). The rules may determine a confidence level based on, for example, criteria set forth below in connection with FIG. 4. The rules may require a prompt user before performing the operation (step 322). In this case, if a user responds (step 324) affirmatively, then method 300 proceeds to step 318.

Alternatively, if step 322 does not require a user input, or a user does not authorize the operation, method 300 proceeds to rule check function (step 326) after which an operation is performed (step 318) or a default operation is performed (step 328).

Figure 4:
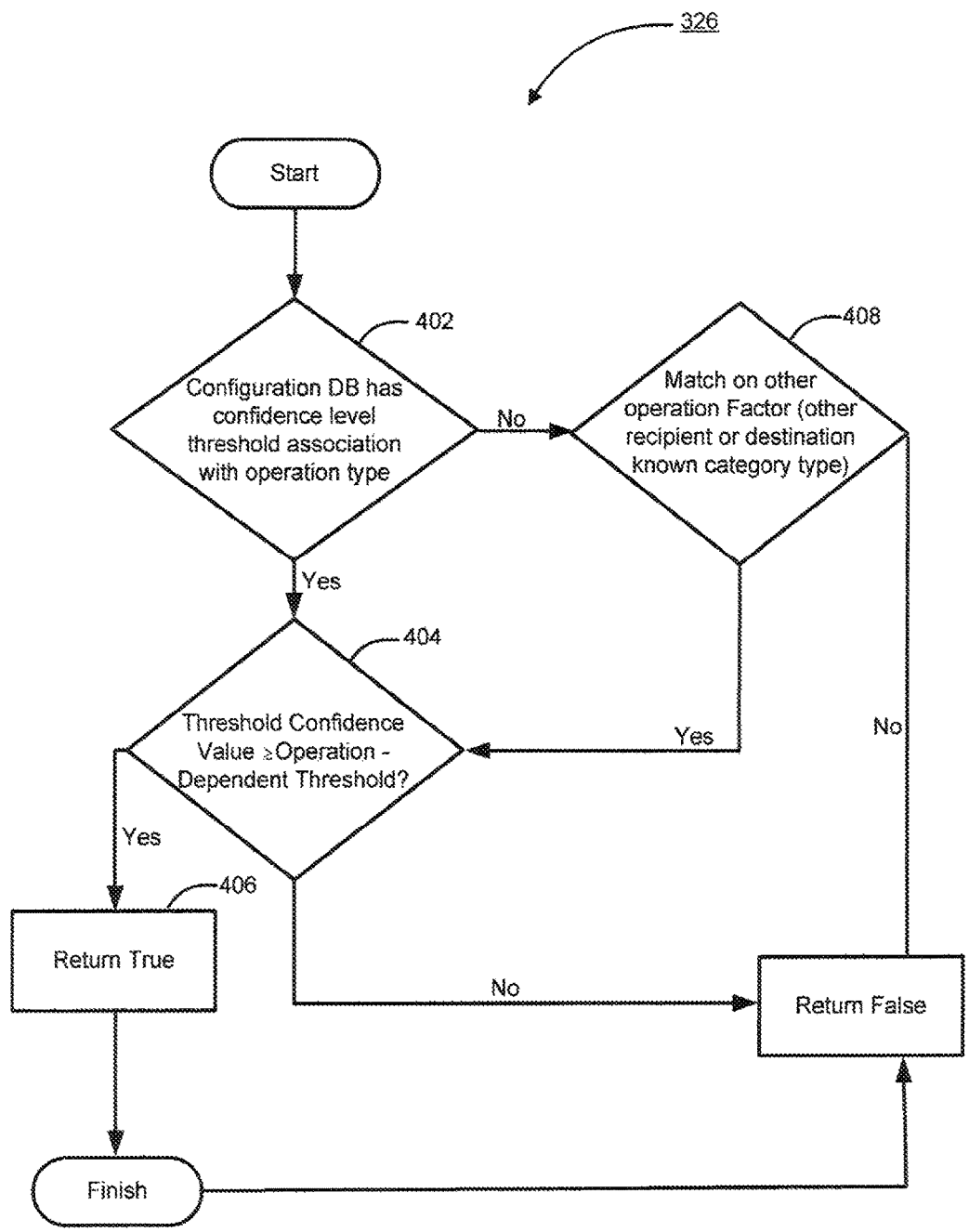
FIG. 4 illustrates another method in accordance with exemplary embodiments of the disclosure.

An exemplary rule check function operation 326 is illustrated in greater detail in FIG. 4. During rule check function operation 326, a determination is made whether a database is queried and a determination is made as to whether the database has a threshold confidence level associated with the operation (step 402). If the database has a threshold confidence level associated with the operation, the method 326 proceeds to determination step (step 404) to determine whether the contact threshold value is greater than or equal to a operation-dependent threshold. If yes, then step 326 proceeds to step 406 and returns a true or yes to step 318 of method 300.

If during step 402, it is determined that the database does not have a confidence level associated with the operation, a confidence level may be determined by other means (step 408). For example, step 408 may use other contacts or other known contact types to estimate a confidence level threshold associated with the operation. Other factors may include known domains for a contact, contextual information within a communication between the user and a contact (e.g., whether known business or personal words were used in the communication), an email signature, a greeting, or the like. This analysis can then contribute to a change in the known or assessed confidence level that can apply to the present communication and/or other communications. For instance, a user may have a contact that is both a business and personal contact so a definite categorization can't be made simply based on the pre-assessed categorization. However, based on other recipients in the email or contextual information from the communication, the assessed confidence level for the contact may be adjusted to meet a threshold for this communication. If an estimate or match is made during step 408, then the process continues to step 404. If no match or estimate is made, then a false or no is returned to step 328 of method 300.

As noted above, in accordance with various exemplary embodiments of the invention a confidence level for a contact may be adjusted over time and the new confidence level may be saved in the contact list. Or, the revised confidence level may be used for a one-time operation, such as use of casual vs. formal email signature during communication with contact, use of casual vs. formal greeting in greeting during communication that may include email, chat or other textual based communication, or textual analysis for key words associated with specific category types.

A contact card contact information may be automatically updated using techniques described herein. For example, a contact card to be updated based on a contact categorization. For example, if a user imports or adds a business contact into a contact list and for whatever reason, the single known phone number is stored under "Home," an application may automatically move that number to the "Work" field once a threshold confidence level was reached that this contact was actually a business contact. This type of operation could be done automatically or driven by a user action and could be applied dynamically as confidence levels change or new information about a contact is attained.

Other exemplary uses for methods of the present disclosure include using a contact type and/or a confidence level to select a sending account for an email, modify an email signature based on contact type or subtype, determine whether or not to archive a "chat" or "IM" conversation, determine whether or not to record a phone call, select so al networking sites for contact related postings (tagged, messaged, etc.), or allow easy correction of contact info: if the user corrects a categorization, then an option to move contact information for home number/address/email/phone to personal number/address/email/phone may be offered.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. For example, although steps of methods are listed in a particular order, the steps need not be performed in the illustrated order and some steps may be performed simultaneously. These and other changes or modifications are intended to be included within the scope of the present invention, as expressed in the following claims.

We claim:

1. A communication method, the method comprising the steps of:
   providing an electronic communication device comprising a determining engine and a comparison engine;
   providing to the electronic communication device a contact-type dependent application for performing an operation using the electronic communication device, the contact-type dependent application selected from the group consisting of a phone application, an email application, a social media application, and a unified communication application;
   providing a contact list comprising contact information, the contact information comprising one or more contact types corresponding to a contact and a confidence level corresponding to the one or more contact types;
   using the determining engine, determining the contact type from the one or more contact types for the operation;
   using the determining engine, determining a confidence level for the one of the one or more contact types for the operation, wherein the confidence level is associated with the operation;
   determining whether a database comprises a threshold confidence level associated with the operation;
   if the database comprises the threshold confidence level, using the comparison engine, comparing the confidence level to the threshold confidence value for the operation; and
   if the confidence level is greater than or equal to the threshold confidence value for the operation, then using the contact-type dependent application to automatically perform the operation using the contact type,
   wherein the contact-type dependent application performs the operation a first way for a first contact type and a second way for a second contact type.

2. The communication method of claim 1, further comprising steps of a user using the electronic communication device to enter the contact type and setting the confidence level for the contact type to high.

3. The communication method of claim 1, further comprising a step of prompting a user for authorization prior to performing the operation.

4. The communication method of claim 1, further comprising a step of storing the confidence level associated with the contact type.

5. The communication method of claim 1, further comprising a step of modifying the contact information.

6. The communication method of claim 1, wherein the contact type is selected from a group comprising business contact and personal contact.

7. The communication method of claim 1, wherein the step of performing an operation comprises performing a task based on the contact type.

8. The communication method of claim 1, wherein the contact-type dependent application is a phone application, and wherein if a user is calling a business contact, the operation comprises use of a PBX driven softphone and if the user is calling a personal contact, the operation comprises use of a native dialer.

9. The communication method of claim 1, wherein a confidence level is automatically adjusted based on one or more of: time, contextual information, and contact information provided by the contact.

10. The communication method of claim 1, wherein the operation is selected from one or more of a phone operation or an email operation.

11. The communication method of claim 1, wherein the confidence level is automatically determined by the application.

12. The communication method of claim 11, wherein the confidence level is based on the contact information.

13. The communication method of claim 11, wherein the confidence level is automatically determined based on communication attributes between a user and the contact.

14. The communication method of claim 11, wherein the contact type is automatically determined based on one or more of: contact information, communication attributes, and real-time analytics.

15. The communication method of claim 1, further comprising a step of prompting a user to verify a contact type.

16. A communication system, the system comprising:
an electronic communication device comprising a determining engine and a comparison engine;
a contact-type dependent application for performing an operation using the electronic communication device, the contact-type dependent application selected from the group consisting of a phone application, an email application, a social media application, and a unified communication application;
a contact list comprising contact information, the contact information comprising a contact type corresponding to a contact and a confidence level corresponding to the contact and an operation;
a comparison engine on the electronic communication device to compare the confidence level to a threshold confidence value for the operation; and
a determination engine on the electronic communication device to determine the contact type from one or more contact types for the operation and to determine a confidence level for the one of the one or more contact types for the operation, wherein the confidence level is associated with the operation,
wherein, if the confidence level corresponding to the contact and the operation is above a threshold, the contact-type dependent application automatically performs the operation, and
wherein the application performs the operation a first way for a first contact type and a second way for a second contact type.

17. The communication system of claim 16, wherein the contact-type dependent application is a phone application, and wherein if a user is calling a business contact, the operation comprises use of a PBX driven softphone and if the user is calling a personal contact, the operation comprises use of a native dialer.

18. The communication system of claim 16, wherein the contact-type dependent application comprises an email application, and the operation comprises modifying an email signature.

19. A method of performing a contact-type dependent operation, the method comprising the steps of:
providing an electronic communication device comprising a determining engine, a comparison engine, and a contact-type dependent application the contact-type dependent application selected from the group consisting of a phone application, an email application, a social media application, and a unified communication application;
using the determining engine to determine whether a contact type is assigned to a contact;
using the determining engine, determining whether a database comprises a threshold confidence level associated with the contact type;
if the database does not comprise the threshold confidence level, then determining the threshold confidence level;
if the contact type is assigned to the contact, determining whether a confidence level for the contact type and the operation is above a threshold value; and
if the confidence level for a contact-type dependent operation is above the threshold value, automatically performing the contact-type dependent operation using application,
wherein the contact-type dependent application performs the operation a first way for a first contact type and a second way for a second contact type.

20. The method of performing a contact-type dependent operation of claim 19, further comprising the step of automatically determining the confidence level.

* * * * *